Sept. 23, 1930. A. G. RAYBURN 1,776,480
DRIVE MECHANISM FOR MOTOR VEHICLES
Filed Sept. 28, 1926 3 Sheets-Sheet 1
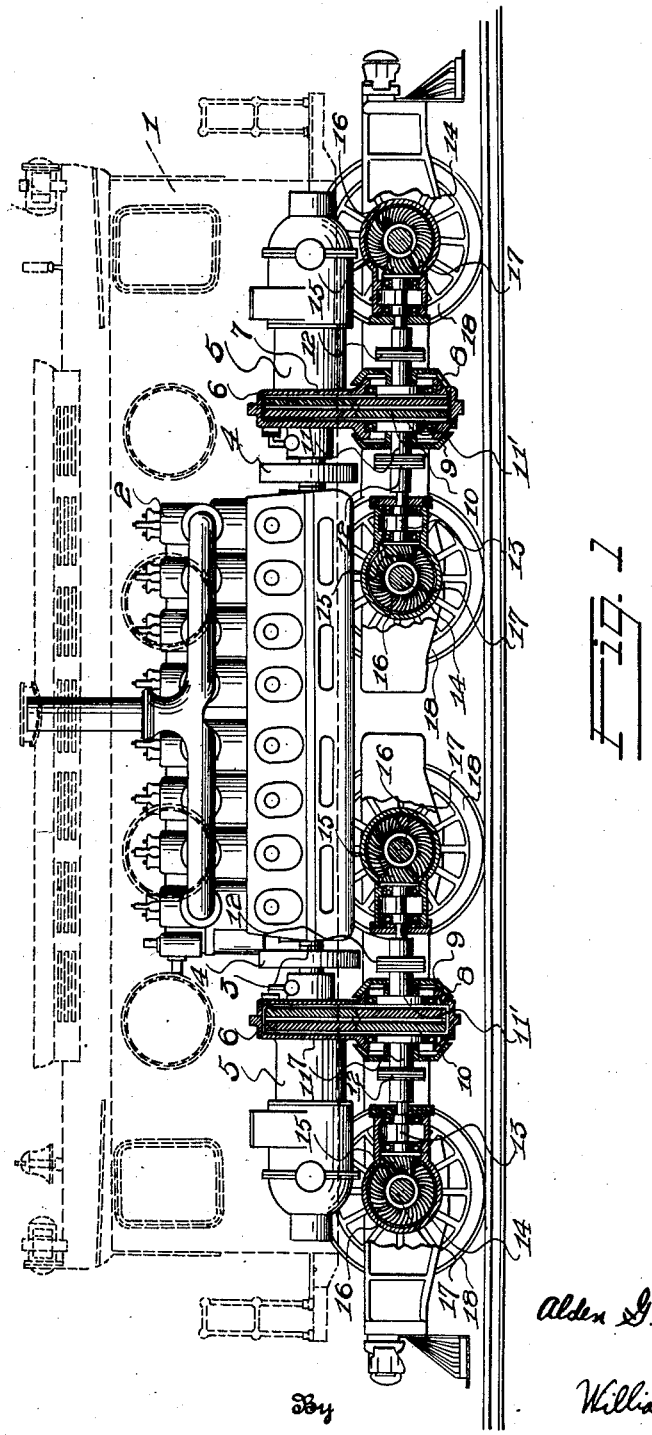

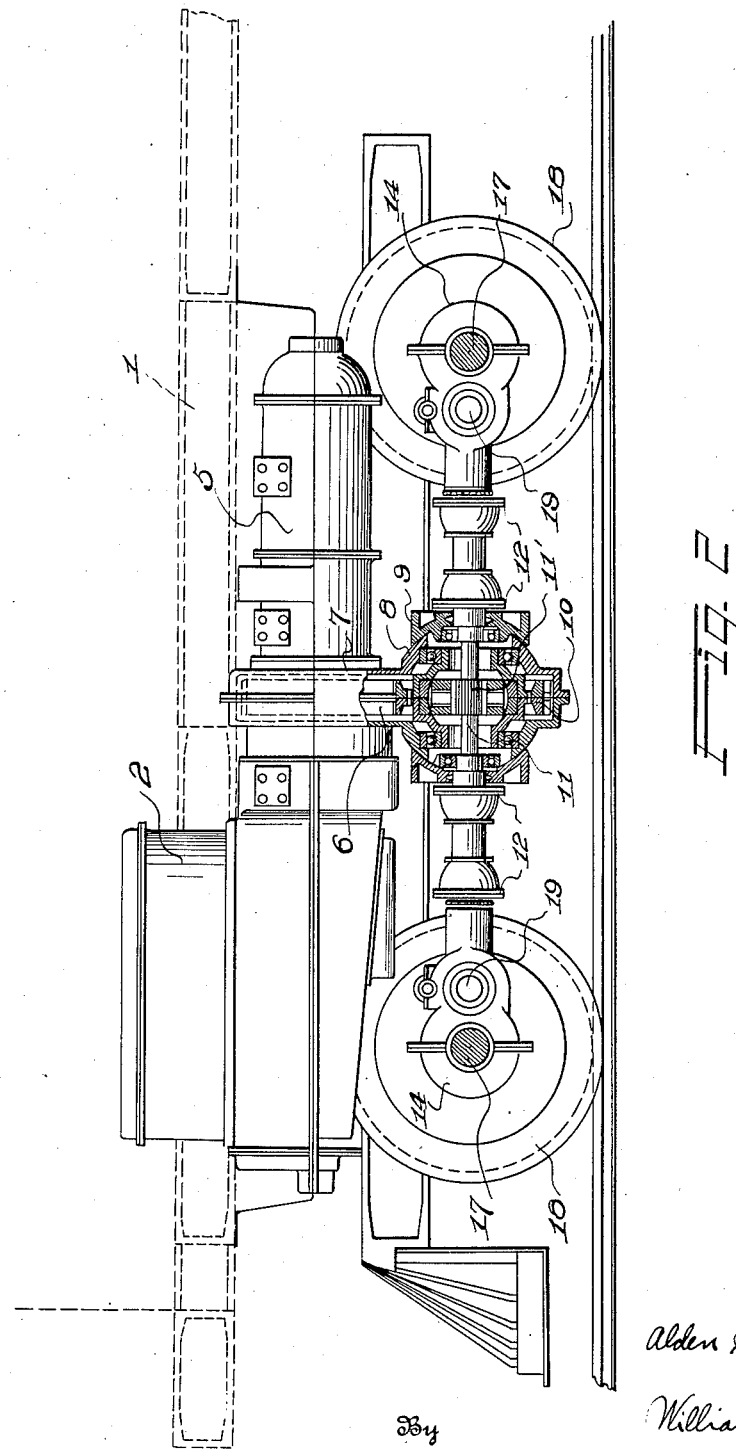

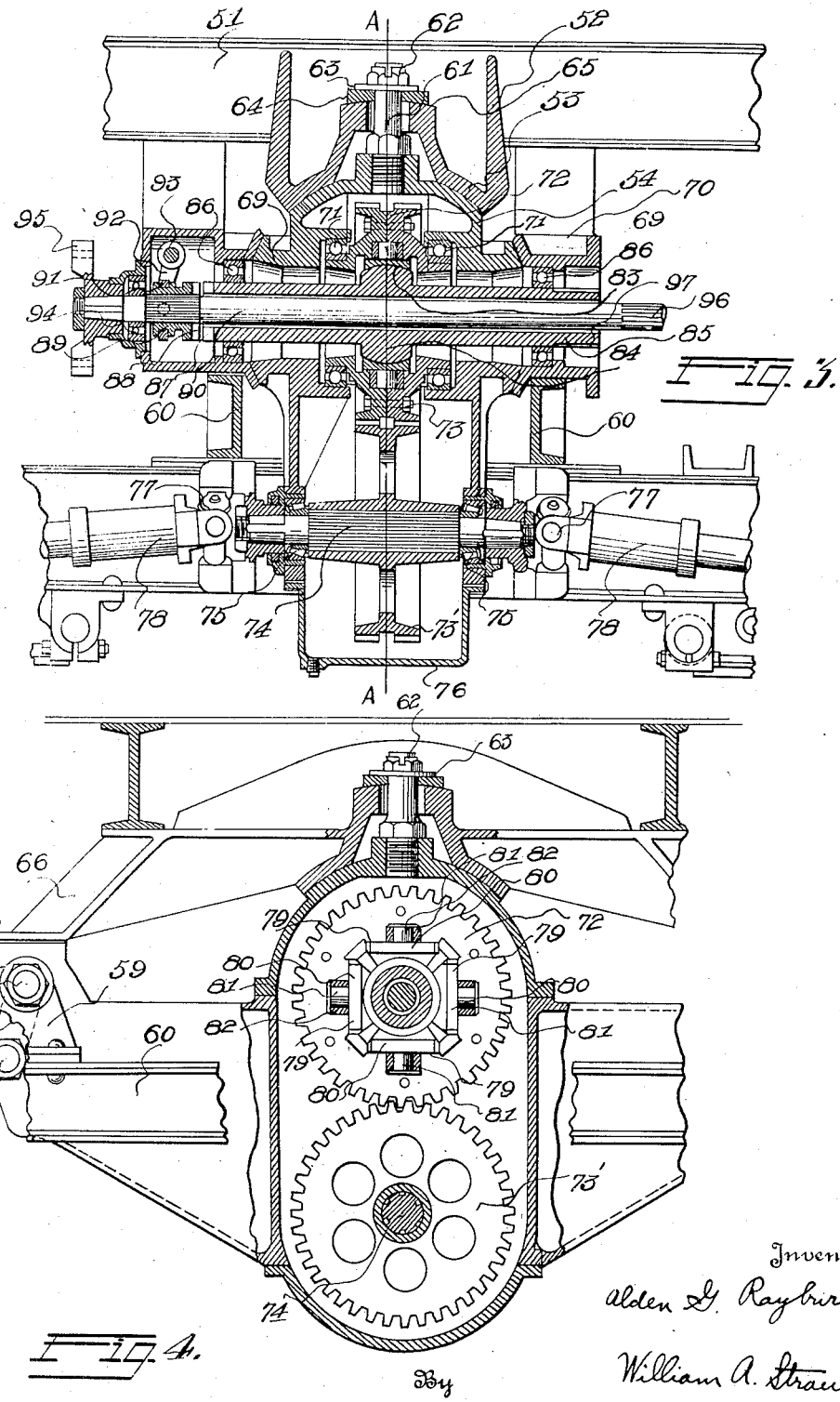

Patented Sept. 23, 1930

1,776,480

UNITED STATES PATENT OFFICE

ALDEN G. RAYBURN, OF SAUSALITO, CALIFORNIA, ASSIGNOR TO EMORY WINSHIP, OF MACON, GEORGIA

DRIVE MECHANISM FOR MOTOR VEHICLES

Application filed September 28, 1926. Serial No. 138,207.

The present invention relates to drive mechanisms for motor vehicles, and more particularly the invention relates to improved drives for railway motor coaches, locomotives, buses and like vehicles, and the present application is a continuation in part of copending application Serial No. 58,805, filed September 26, 1925.

Various forms of drive mechanisms for railway motor coaches, locomotives, and like vehicles have been proposed in which the driving motor or motors have been mounted in the car body, but such proposed constructions have not provided satisfactory compensating means in the drive connections between the motor and trucks, for necessary relative universal motion of the trucks and the car body under service conditions. As a result, where direct gearing has been used between the motor trucks, the relative movement of the trucks and body introduce shocks in the gearing, and where vertical drive shafts are utilized undesirable turning reactions tending to throw the trucks off the track are developed. To eliminate these undesirable features of direct gear connections, flexible drive connections between the driving motor and truck have been proposed in which angular splined or telescoping propeller shafts lead from the driving connections or gearing in the car body to the driving mechanism of the trucks. Because of the motion in the spline connections due to the universal relative movement of the trucks and body, and the relatively great powers which must be transmitted through the angular splined connections, this type of drive rapidly deteriorates, the life thereof is short, and the maintenance cost is high.

To overcome the difficulty introduced due to the angularity and spline movement of the driving or propeller shafts, various arrangements for mounting independent motors on each truck have been proposed. While these arrangements have been found to be operative for electric motor and internal combustion engine drives of smaller powers, when an effort is made to provide motors for the relatively heavier powers it is found that there is not sufficient room for the mounting of the larger motors on the trucks and at the same time to maintain a reasonable height of the vehicle body from the ground or track level. Where relatively large electrical drive or internal combustion motors are to be utilized such for example, as are utilized in locomotives it is impossible to mount the motors on the driving trucks.

Accordingly, an object of the present invention is to provide a drive for rail cars, locomotives and like vehicles in which angular drive shafts are eliminated while at the same time provision is made for a universal movement of the trucks with relation to the car body without introducing shocks or undesirable turning reactions in the trucks or driving mechanism under service conditions.

A rail car or locomotive must exert substantially its maximum tractive effort at start and at low speeds to overcome the inertia and to accelerate its movement and to accelerate the movement of trailers or a train which may be drawn thereby. In Diesel engines and other types of internal combustion engines, the torque of the engine is substantially a function of the speed of the engine, the engine developing its maximum torque at high speed. In order that Diesel or internal combustion engines may be used in a locomotive or rail car, a variable speed torque multiplying transmission must be interposed between the engine and the drive trucks, so that in starting the traction wheels will rotate at a low speed while the engine is developing its maximum torque.

A further object of the invention is to provide a locomotive or rail car driven by a relatively high powered internal combustion engine in which suitable arrangements for varying the speed of the locomotive are provided independently of speed variations of the driving motor.

Another object of the invention is to provide divided driving arrangements whereby relatively smaller powered variable speed transmissions may be interposed between the engine and the driving trucks together with novel reversing arrangements especially adapted for use with hydraulic transmissions.

Still further objects of the invention will appear in the following detailed description thereof and are such as may be attained by a utilization of the various combinations, sub-combinations and principles hereinafter set forth.

As shown in the drawings:

Figure 1 is a diagrammatic side elevation showing an embodiment of my invention as applied to a locomotive.

Figure 2 is a diagrammatic view showing the application of my invention to a railway motor coach.

Figure 3 is a sectional view showing the novel parts of a preferred drive arrangement embodying the invention.

Figure 4 is a sectional view taken along line A—A of Figure 3.

As shown in Figure 1, a body 1 is provided in the framework of which an internal combustion engine 2, such for example as a Diesel engine, is centrally located with the crankshaft 3 thereof extending longitudinally of the car body. Crankshaft 3 is provided with fly wheels 4 and is connected at its ends to power transmissions 5. Transmissions 5 are preferably hydraulic transmissions of the type shown in my copending applications Serial Numbers 97,921 filed March 27th, 1926 and 123,701 filed July 20th, 1926 in which the driving shaft actuates a variable torque multiplying mechanism, drives the final driven gear 6 surrounding the drive shaft and disposed between the torque multiplying mechanism, and the engine. While the transmission mechanisms 5 in the preferred embodiments are hydraulic transmissions, it will be understood by those skilled in the art that any suitable torque multiplying and speed reducing transmission mechanism may be utilized between the ends of the crankshaft 3 and the gear 6 and may be disposed outside of the gears 6. The transmissions 5 are secured rigidly to the frame of the body 1, preferably through body bolsters 7 which are provided with universal pivot members 8 having spherical surfaces seated in suitable spherical seats provided in truck bolsters 9 in turn supported from the truck frame side members of the driving trucks which may be of the type disclosed in my copending application Serial No. 58,805, filed September 26, 1925, or of any other well known truck construction. Meshing with and driven by the gears 6 are the spur gears 10 which are journaled for rotation in suitable bearings secured in universal pivot members 8 and are connected to driving shaft section 11 by means of universal joints 11' of any suitable type such for example as are shown in my copending application Serial No. 58,805 or by my improved square type of universal joint more fully hereinafter set forth in describing the form of invention shown in Figures 3 and 4. Shafts 11 are journaled in the central section of the truck bolsters 9 and are connected by flexible or universal couplings 12 to the axle driving propeller shafts 13. Propeller shafts 13 are suitably journaled in axle housings 14 and secured to the ends thereof are the bevel pinions 15 which mesh with reversing axle bevel gears 16 which drive axles 17 and wheels 18. The driving torque reaction of the housings 14 may be resisted by suitable connections to the truck frame member as more fully set forth in my copending application.

In operation of this form of the invention, power is transmitted from opposite ends of the engine through the transmissions 5 to drive gears 10 which are supported from and movable with the car body. Gears 10 through universal joints 11' drive shafts 11 which are supported on and movable with the truck bolster. From shaft 11 power is transmitted through flexible or universal couplings 12 to axles 17 which drive the wheels 18. Due to the universal connection between gears 10 and shaft 11, and the provision of a universal or flexible coupling 12, no shocks due to relative movement of the truck and the body are transmitted through the driving gearing, and relative universal movement of the truck and body to meet road conditions is permitted without restriction and without substantial angularity in the driving connections.

In Figure 2 the application of my invention to a railway motor coach with only one drive truck is shown. Parts similar to those shown in Figure 1 have been given like reference numerals. As this form of invention functions substantially the same as one end of mechanism shown in Figure 1, a full understanding thereof will be had from a reference to the description hereinbefore given. A reversing mechanism indicated at 19 may be provided in the axle housings 14. Reversing axles of this type are well known for railway axle drives, one form especially adapted for use with the present invention being shown in U. S. Patent No. 1,557,336 issued October 13, 1925.

In Figures 3 and 4 the frame channels 51 for the car or locomotive body are supported on a body bolster casting 52 which is provided with a central cup or seating member 53. The cup or seating member 53 is provided with a spherical bearing surface which seats on a suitable spherical bearing surface of truck bolster cap 54 which in turn is bolted to and supported from the lower ends of links 56 by pins 57. The upper ends of links 56 are supported by pins 58 which in turn are secured in brackets 59 supported on the frame cross members 60. The construction of the remainder of the truck mechanism not shown or specifically described may be the same as shown in Patent No. 1,544,574 to which reference may be had for a full disclosure thereof. Threaded into the truck bolster cap member 54 is a securing and pivot stud 61. A nut 62 threaded on the upper end of stud 61 holds washer 63 and locating collar 64 in position with the lower spherical surface of the collar 64 engaging spherical bearing surface 65 of the car bolster 52. Car bolster 52 is provided with extensions or legs 66 having supporting faces 67 that are slightly spaced from and cooperate with the faces 68 of the truck bolster to limit the relative tilting movement of the car body and the truck in well known manner. Formed integrally with truck bolster cap 54 and the bolster 55 are extensions 69 provided with spherical bearing surfaces that engage cupped spherical bearing surfaces formed in the supporting castings 70. Castings 70 are secured rigidly to frame channels 51. All of the spherical bearing surfaces are concentric and connect the body and truck together permitting limited relative universal movement thereof about the center of the surfaces as a neutral point of motion.

Journaled in bearings 71 supported in the truck bolster is driving spur gear 72, formed of halves secured together by the bolts 73. Gear 72 meshes with and drives gear 73' which is splined to and drives shaft 74. Shaft 74 is journaled in bearings 75 in turn supported in the side walls of gear casing section 76 formed integrally with the truck bolster. The outer ends of the shaft 74 have secured thereto the universal or flexible drive joints 77 that drive the telescoping propeller shaft sections 78 which in turn drive the axles of the truck. The center of gear 72 is located at the neutral point of motion between the vehicle body and the truck and formed centrally in this gear is a substantially square recessed section provided with bearing surfaces 79 against which the outer flat surfaces of driving shoes 80 bear. Drive shoes 80 are each provided with a trunnion 81. Trunnions 81 are journaled in bushing 82 of gear 72 and are arranged in axially aligned pairs with the axes of the pairs at right angles to each other and intersecting at the neutral point of motion between the truck and car body. Shoes 80 are provided with inner curved bearing surfaces that bear against complemental curved surfaces 83 of a square universal member 84 formed integrally with a driving sleeve 85. Sleeve 85 is journaled in bearings 86 which are supported in castings 70. Formed on one end of the sleeve 85 are dogging teeth 87 adapted to be engaged by and mesh with teeth 88 formed on the end of the dogging or coupling member 89. Member 89 is slidably splined on a suitably grooved section of the driving shaft 90 and is actuated by a ring 91 nested in a peripheral groove formed therein. Ring 91 is secured to the lower ends of actuating arms 92 which at their upper ends are keyed to an actuating shaft 93. Shaft 93 is journaled in the casting 70 and may be operated by any suitable mechanism to shift the coupling member 89 endwise on the shaft 90. Shaft 90 is journaled in the sleeve 85 and in a suitable bearing 94, and secured to an end thereof is a coupling member 95. At its opposite end shaft 90 is provided with a splined section 96 to which the driving shaft of a suitable transmission (not shown), for example, my improved hydraulic transmission, may be coupled. Sleeve 85 is provided with a splined section 97 to which the driven member or shaft of the transmission may be coupled. The transmission may be secured to frame channels 51 in any suitable manner, and coupling 95 may be connected to the crank or driving shaft of a suitable motor or prime mover of any suitable type that is also supported from the frame channels 51.

In operation of this form of invention power transmitted from the prime mover to the coupling 95 drives the shaft 90 and transmits the driving power to the transmission mechanism which in turn through the splines 97 drives sleeve 85. Sleeve 85 drives square universal joint member 84 exerting a driving pressure which is transmitted through the shoes 80 and the bearing surfaces 79 to gear 72. Gear 72 drives gear 73' and shaft 74, and through the flexible couplings 77 drives the propeller shafts 78 and the axles of the truck. As the vehicle passes over road irregularities universal movement of the truck bolster in which the gears 72 and 73' are supported will occur with relation to universal drive member 84 and the vehicle frame bolster. Since the axes of trunnions 81 of the shoes 80 intersect at the center of this universal movement of the truck bolster and frame bolster, universal movement centered at the center of relative movement of the truck bolster and vehicle body will be permitted between the gear 72 and the driving sleeve 85, causing sliding movement of blocks 80 on the curved surfaces 83 of the universal member 84 and rotation of the blocks 80 about their trunnions 81. The trunnions 84 hold shoes 80 in proper position and permit rotation thereof, but the driving forces are transmitted through the surfaces 79 of the gear 72 rather than through trunnions 81. It is to be noted that the universal movement is permitted without imparting shocks to the driving gearing or driving mechanism.

When the prime mover can handle the load in direct couple, shaft 93 may be actuated to shift the coupling member 89 to the right in Figure 3 meshing teeth 87 and 88. The driving forces will then be transmitted from shaft 90 through coupling member 89 to sleeve 85 without passing through the torque multiplying and speed reducing transmission. In this way in direct couple all driving strains are removed from the torque multiplying mechanism. Where it is desired to drive a truck from each end of an engine as shown in Figure 1, the mechanism as shown in Figures 3 and 4 may be used at opposite ends of the engine shaft.

It will be obvious that instead of disposing the transmission and prime mover on opposite sides of driving gear 72, the transmission may be interposed between coupling member 95 and the prime mover, and in this case the dogging member 89 will serve to connect and disconnect the transmission mechanism and the engine and driving gearing for the axles, giving a neutral position for the mechanism independently of any neutral position that may be provided in transmission.

It will be understood that the novel universal construction disclosed in Figures 3 and 4 may be used in the forms of invention shown in Figures 1 and 2 and is useful in independent relations, and any suitable type of universal joint may be substituted for those disclosed without departing from the spirit of the invention.

It will be obvious to those skilled in the art that wide departure may be made from the specific details of my invention hereinbefore described.

Accordingly what is desired to be secured by Letters Patent and claimed as new is:

1. A vehicle comprising a body, trucks supporting said body, said trucks being secured to said body in a manner permitting limited universal movement of each truck relative to said body, a motor supported on said body, torque multiplying mechanism on said body, and means between said motor and mechanism to transmit the power of said motor from said mechanism to said truck, said last named means including a shaft supported by said body between its ends and mounted to have universal movement about the center of universal movement between said truck and body.

2. A vehicle comprising a body, a truck including a plurality of driven axles supporting one end of said body, said truck being attached to said body in a manner permitting limited universal movement of the truck relative to the body, a motor and a torque multiplying mechanism secured to said body, a gear operated by said mechanism, a second gear in mesh with said first named gear and arranged with its axis normally substantially in the plane of the axes of the truck axles, said gears being arranged between said motor and mechanism and being immovably supported from said body, a driven shaft between said axles operated by said second gear, said shaft being connected to said gear in a manner permitting universal movement thereof relative to said gear substantially about the center of the universal movement between said truck and body.

3. A vehicle including a body, a truck supporting each end of said body in a manner permitting limited universal movement of each truck relative to said body, a motor arranged on said body between the points of universal connection of the body with the trucks, torque multiplying mechanism supported on said body at each end thereof, and means arranged between said motor and mechanism for transmitting the power to each truck, said last named means being designed to transmit the power through elements between which there is limited universal movement about the center of the universal movement between said body and trucks.

4. A vehicle such as defined in claim 3 in which the last named means includes a shaft, the axis of which is normally substantially in the plane that includes the axes of the driven axles of each truck, but at right angles thereto.

5. A locomotive including a body, trucks pivotally supporting each end of said body, each of said trucks including driven axles, a motor supported on said body between the ends thereof, torque multiplying mechanism adjacent each end of said body operatively coupled to said motor, and means between each of said mechanisms and said motor for transmitting the power to said axles, said means being arranged adjacent the pivotal mounting of said trucks.

6. A vehicle comprising a body, a truck supporting said body, said truck being flexibly connected to said body in a manner permitting movement of the truck relative to the body, a motor on said body on one side of said flexible connection, a torque multiplying mechanism operatively connected to said motor and arranged on the other side of said connection, and means between said motor and mechanism and arranged adjacent said flexible connection for transmitting the driving torque to said truck.

7. A vehicle including a body, a truck, said truck including driven axles, means to reverse the direction of rotation of said axles carried by said truck, means to flexibly connect said truck to said body permitting limited universal movement of the truck relative to the body about a center, a driving shaft carried by said truck, and mechanism operatively connecting said driving shaft and the driven axles of the truck, said mechanism including means connected to an element carried by said body in a manner permitting universal movement of said means relative to said element substantially about the center of relative movement between said truck and body.

8. The combination defined in claim 7 in which the common center of universal motion between truck and body and between the driving element carried by the body and the driven means carried by the truck lies normally substantially in the plane that includes the axes of the driven axles.

9. A vehicle comprising a body, a truck supporting said body, said truck being secured to said body in a manner permitting limited universal movement of said truck relative to said body, a torque multiplying mechanism and a motor disposed on opposite sides of the center of universal movement between the truck and body, and means to operatively connect said motor, said torque multiplying mechanism and said truck, said means including a gear and a shaft one of which is supported on said body and the other on said truck, said gear and shaft being interconnected so that universal movement between the gear and shaft can take place about a center that is approximately coincident with the center of universal movement between the truck and body.

10. A vehicle comprising a body, a truck disposed beneath said body and connected thereto so that the truck is capable of limited universal movement relative to the body, power means and transmission mechanism supported by said body on opposite sides of the center of universal movement between the truck and body, and mechanism to operatively connect said power means and transmission mechanism to said trucks including a gear and a shaft, one of said last named elements being supported by said truck and the other being supported by said body, said elements being connected together by a universal connection that permits relative movement between said gear and shaft about a center that is approximately coincident with the center of universal movement between said truck and body.

11. A vehicle comprising a body and a truck, a bolster carried by said body, a bolster carried by said truck, said bolsters being united together so that limited universal movement may take place between them about a center, power means and a transmission mechanism disposed on opposite sides of said center, and mechanism to transmit the power from said power means to said transmission mechanism and from said transmission mechanism to said truck, said last named mechanism comprising a gear and a shaft, one of said last named elements being carried by the body and the other being carried by said truck bolster, said gear and shaft being operatively connected together so that the gear will rotate as a unit with said shaft by a connection that permits limited universal movement between said shaft and gear about a center that is approximately coincident with said first named center.

12. A vehicle comprising a body, a truck, a bolster carried by said body, a bolster carried by said truck, said bolsters being united together so that limited universal movement may take place between them about a center, power means and a transmission mechanism supported on said body, and mechanism to transmit the power from said power means to said transmission mechanism and from said transmission mechanism to said truck, said last named mechanism comprising a gear and a shaft arranged so that its axis normally extends substantially horizontally and is disposed approximately in the plane that contains the axes of the axles of the truck, said gear being carried by the body bolster and said shaft being mounted for rotation in said truck bolster and connected to said gear, so that the gear will rotate as a unit with said shaft, by a connection that permits limited universal movement between said shaft and gear about a center that is approximately coincident with said first named center.

13. A vehicle comprising a body, a truck disposed adjacent each end of, and supporting said body, a body bolster for each truck, a truck bolster forming a part of each truck, said body and truck bolsters being united together so that limited universal movement may take place between them about spaced centers, an internal combustion engine supported on said body between said centers, a shaft extending in opposite directions from said internal combustion engine, a transmission mechanism connected adjacent each end of said engine shaft, a gear disposed between each transmission mechanism and said internal combustion engine, each of said gears being disposed vertically above one of said centers, a gear supported in each of said truck bolsters in mesh with one of said first named gears, normally horizontally extending shafts extending from each of said last named gears in opposite directions toward the axles of said truck, said last named shaft in each truck and the axles of said truck being arranged so that their axes of rotation are normally disposed in the same horizontal plane, and mechanism connecting each of said shafts with one of the gears carried by said body bolster, said connections permitting unrestricted universal movement between each shaft and its gear about a center that is approximately coincident with one of said first named centers.

In testimony whereof I affix my signature.
ALDEN G. RAYBURN.